United States Patent [19]

Spence

[11] E Re. 29,010

[45] Reissued Oct. 26, 1976

[54] ORAL CAVITY SIZE CONTROLLED MUSICAL SOUND APPARATUS AND METHOD

[76] Inventor: Larry A. Spence, 720 Fairlane, Apt. D, Longmont, Colo. 80501

[22] Filed: Feb. 21, 1975

[21] Appl. No.: 551,893

Related U.S. Patent Documents

Reissue of:

[64] Patent No.: 3,730,046
Issued: May 1, 1973
Appl. No.: 225,732
Filed: Feb. 14, 1972

[52] U.S. Cl. ..... 84/1.05; 84/1.01; 84/1; 84/DIG. 21

[51] Int. Cl.[2] ..... G10H 3/00

[58] Field of Search ..... 84/1.01, 1.05, 1.06; 179/1 AL, 1 VC, 1 F, 1 M

[56] References Cited

UNITED STATES PATENTS

| | | | |
|---|---|---|---|
| 2,355,287 | 8/1944 | Firestone | 84/1.06 |
| 2,374,090 | 4/1945 | French | 179/1 AL |
| 2,868,876 | 1/1959 | Ticchioni | 179/1 AL |
| 3,009,991 | 11/1961 | Bekey | 179/1 F |
| 3,549,775 | 12/1970 | Kaminsky | 84/1.06 X |
| 3,571,480 | 3/1971 | Tichenor et al. | 84/1.05 |

*Primary Examiner*—Ulysses Weldon
*Attorney, Agent, or Firm*—Ancel W. Lewis, Jr.

[57] ABSTRACT

*In a method and apparatus for controlling musical sounds there is provided a housing with an inner cavity and a mouthpiece forming an air channel and a loudspeaker cone for vibrating the air in the inner cavity for introducing sound energy into the oral cavity of a player via the mouthpiece. The sound energy is acoustically monitored by a microphone which produces an output control signal that is used to control the pitch of an electric sound generator in relation to the size of the oral cavity.* Means forming an air channel is connected between the output of [a] *the* loudspeaker and the input of [a] *the* microphone. The output of the microphone is amplified by means of an amplifier, the output of the amplifier being fed to the speaker, an acoustical feedback path thus being formed between the speaker and the microphone. A mouthpiece is connected in this acoustical path such that an operator can determine the frequency of the feedback signal by adjusting the size of this oral cavity, thus forming musical tones.

20 Claims, 5 Drawing Figures

ORAL CAVITY SIZE CONTROLLED MUSICAL SOUND APPARATUS AND METHOD

Matter enclosed in heavy brackets [ ] appears in the original patent but forms no part of this reissue specification; matter printed in italics indicates the additions made by reissue.

This invention relates to [electronic] musical instruments, and more particularly to [such an instrument] *a novel method and apparatus for controlling musical sounds* in which the [basic tones] *pitch or fundamental frequency of the musical sounds produced* are [determined by] *controlled by the size of* the operator's oral cavity.

In whistling and singing, the size of the oral cavity is varied so as to resonate at various frequencies to produce a range of tones. [Various musical instruments have been devised in the prior art for making use of this capability. Such devices, however, generally involve the introduction of an externally generated sound which is filtered or modulated by the oral cavity.] *There have heretofore been provided devices that produce musical sounds that in general have the sound altered by the size of the oral cavity of the player. There are known musical instruments such as the harmonica in which the oral cavity is used to alter the harmonic content of the notes produced. Another known prior art device is shown in U.S. Pat. No. 2,355,287 which involves the introduction of externally generated musical sounds into the oral cavity, the musical sounds being filtered or monitored by the player's oral cavity and then emitted from the oral cavity.*

The [device] *method and apparatus* of this invention is a unique improvement over [such prior art devices in that the frequencies of the basic tones are determined by means of the oral cavity itself, with no external source of sound being involved.] *known prior art method and apparatus in that sound energy is introduced into the oral cavity of the player to obtain information on the size thereof and this size information is monitored in such a way that it produces a monitored signal capable of controlling the pitch of a sound generator that emits musical sounds so that the pitch of the sounds emitted by the musical sound generator are in a direct relation to the size of the oral cavity.* This provides a unique acoustical effect not present in prior art devices in that the operator himself can determine the [basic generated tone] *pitch of the musical sounds being emitted into the atmosphere.* The device of the invention further can be fabricated from a minimum number of components which can be assembled at a relatively low cost.

It is therefore an object of this invention to provide a unique *musical sound apparatus and method and unique* electronic musical instrument.

It is a further object of this invention to enable the [formation of musical tones] *regulation of the pitch of musical sounds* by means of one's oral cavity without the use of the vocal cords [or an external sound source].

It is another object of this invention to provide a unique electronic musical instrument which utilized the intuitive capacities of the operator [in forming tones] *for controlling the pitch of musical sounds emitted into the atmosphere.*

*Another object of this invention is to provide a novel method and apparatus using the acoustical character of the oral cavity of the player as the basis for controlling the pitch of sounds emitted into the atmosphere.*

Other objects of the invention will become apparent as the description proceeds in connection with the accompanying drawings, of which:

Figure 1:
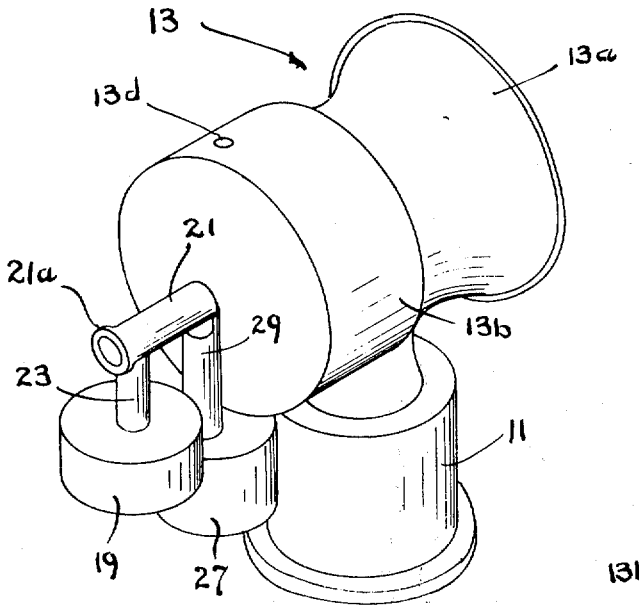
FIG. 1 is a perspective view illustrating one embodiment of the device of the invention.

Briefly described, [the device of the invention is as follows: The cone of a loudspeaker is used to form one wall of an enclosure. A channel forming an acoustical path connects this enclosure to another enclosure in which a microphone is contained. A mouthpiece is inserted in this channel. An amplifier is used to amplify the output of the microphone, the output of the amplifier being connected to the speaker. An acoustical feedback path is thus formed between the speaker and the microphone. When an operator places his lips on the mouthpiece, he can determine the frequency of the feedback signals by varying the effective size and thus the resonant frequency of his oral cavity. It is thus possible to generate musical tones.] *in one form of the apparatus shown the cone of a loudspeaker in a housing open at one end is coupled to a first tubular member terminating in a mouthpiece whereby the vibration of the cone introduces sound energy into the oral cavity of a player to obtain information on the size of the oral cavity and a second tubular member in flow communication with the first tubular member adjacent the mouthpiece has a microphone which monitors the sound energy in the oral cavity and produces an output control signal. The output control signal contains information about the size of the oral cavity that is amplified by an electric amplifier and coupled back via a feedback line to the coil of the loudspeaker to form an electric oscillator with the loudspeaker in the feedback loop of the electric oscillator to utilize the information on oral cavity size to control the pitch of the sound emitted by the loudspeaker. Since the oral cavity is acoustically coupled in the feedback loop of the electric oscillator a change in the size of the oral cavity changes the resonant frequency of the electric oscillator and thereby changes the pitch of the sound emitted by the loudspeaker via the open end.* A pressure-responsive switch may be connected to the mouthpiece so that it is responsive to blowing pressure of the operator, this switch being placed either in the electrical or acoustical circuit so as to complete either of these circuits only when the operator is expelling air.

In one embodiment of the invention the [tone output] *sound produced* comes directly from the cone of the speaker utilized in the feedback circuit. In a second embodiment of the invention both sides of the speaker cone are enclosed by containing walls and the [output tones are] *sound produced is* generated by taking the output of the amplifier in the feedback circuit and feeding this to another amplifier which drives a separate loudspeaker. This second embodiment has the advantage of permitting control of the amplitude and other qualities and characteristics of the *pitch or* tones.

*The definition of the term "pitch" as used herein is that which is commonly associated with musical sounds and refers to the fundamental frequency of the vibration.*

*The definition of the term "tone" as used herein refers to any musical sound considered with reference to its quality, pitch, strength, etc. Tone also refers to the quality of sound. Quality of sound is a characteristic of a musical tone. It distinguishes a tone produced by one musical instrument. Tone differs from pitch in that it includes overtones or harmonics of the fundamental frequency while pitch prefers only to the fundamental frequency.*

Figure 2:
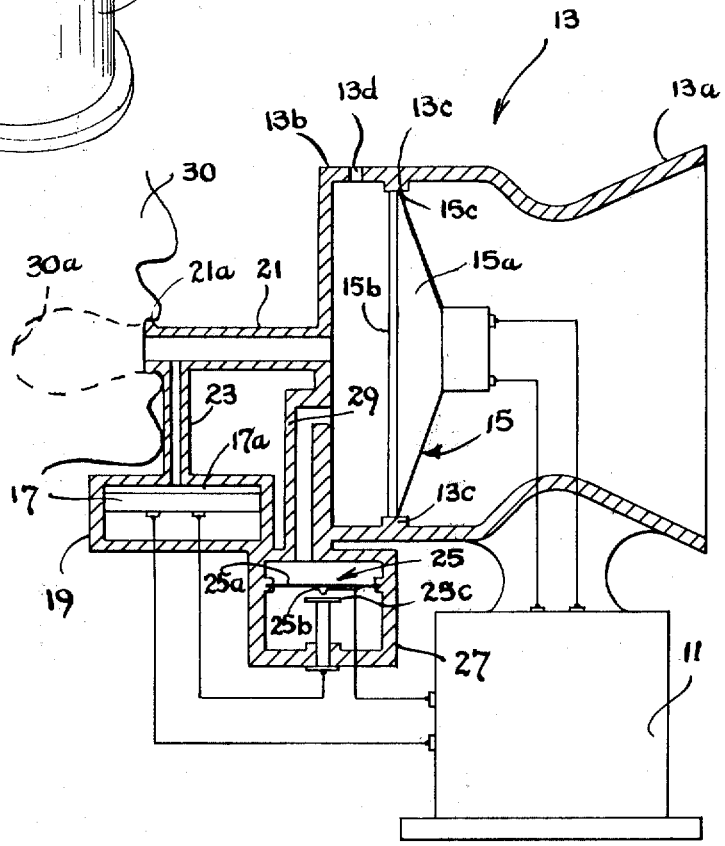
FIG. 2 is a view of the embodiment of FIG. 1 partially cross-sectioned to illustrate the various components thereof.

Referring now to FIGS. 1 and 2, one embodiment of the device of the invention is illustrated. Casing 11 houses amplifier circuitry and power source therefor which may comprise batteries or an AC power supply for furnishing DC. Mounted on casing 11 is speaker housing 13. Speaker housing 13 includes a horn portion 13a for acoustically aiding the transmission of the sound radiated by the rear surfaces of the speaker cone 15a of speaker 15. Housing 13 further includes a speaker enclosure portion 13b which, with the front surface 15b of the speaker cone, forms an enclosure for the sound radiated by the front of the speaker. The rim portion 15c of the speaker is sealed to a ridge 13c which runs along the inner wall of the housing so that the speaker effectively forms a sealed wall of enclosure portion 13b. A pressure relief hole 13d is formed in enclosure portion 13b to permit a rapid reduction in pressure when the operator stops expelling air so the pressure actuated switch can open to end the note.

A microphone 17, which may be of the dynamic type, is mounted in casing 19. An air channel is provided between enclosure portion 13b and casing 19 by means of tube 21 which has fluid communications to the inside of enclosure portion 13b and tube 23 which provides fluid communications between tube 21 and casing 19. The input portion 17a of microphone 17 faces towards the input of tube 23. Thus, an acoustical channel is formed between the output of speaker 15 and the input of microphone 17. A mouthpiece 21a is formed at the end of tube 21 for use in operating the instrument. It is to be noted that tube 23 effectively provides a probe for transmitting sound energy to the microphone.

*In this way the housing 13 and speaker cone 15a defines a cavity of a substantially constant configuration for confining a mass of air and communicating with external surrounding air through a small opening leading into the tube 21 having the mouthpiece 21a at one end so as to form a cavity resonator inside the housing 13. The oral cavity of the mouth of the player 30a and cavity in housing 13 are thereby coupled by tube 21 so there is formed a resonant frequency for the combination of the two and when the cone of the loudspeaker is vibrated as when the coil is actuated sound energy is transmitted back and forth between the cavity in housing 13 and the oral cavity 30a.*

For optimum results, the tube members 21 and 23 should be as short as possible so as to minimize phase lag in the acoustical path provided thereby which would tend to limit the high frequency range of the instrument. Further, microphone probe 23 should be connected to tube 21 as close to mouthpiece 21a as possible, to most accurately reflect the characteristics of the sound developed in the operator's oral cavity.

Pressure-actuated switch 25 is housed in casing member 27, an air channel being formed between casing 27 and enclosure portion 13b by means of tube member 29. The contacts of pressure actuated switch 25 are connected in series between mircophone 17 and the amplifier contained in housing 11, as shown schematically in FIG. 3. Switch 25 may comprise any switch unit sensitive to air pressure, such as for example an elastic membrane 25a which closes contacts 25b and 25c in response to an air pressure signal.

In operating the device, an operator 30 places his lips over mouthpiece 21a and blows into the mouthpiece, at the same time [ forming ] *establishes a pitch and forms* a tone to be played with his oral cavity 30a. The oral cavity size is varied [ as in whistling or singing to form the tone ] *to change the pitch of the musical sounds being produced by the loudspeaker 15 as a result of its connection in the feedback loop of the electric oscillator circuit*. The simultaneous blowing action provides a pressure signal which closes switch 25, providing an electrical path from microphone 17 to amplifier 33 (see FIG. 3). The sound from the amplifier is fed to speaker 15 and an acoustical feedback path is provided from the speaker to the microphone through tube 21 and microphone probe 23, resulting in oscillation. The frequency and acoustical characteristics of this oscillation are determined by the acoustical resonance characteristics of the oral cavity 30a, the operator being able to change these characteristics to produce various [ tone outputs ] *sounds*.

It is to be noted that the speaker cone must be substantially airtight so that air pressure can be built up on the front portions 15b thereof. Further the front portion of the speaker cone should be waterproofed because of the high level of condensation that occurs within enclosure portion 13b when the instrument is operated. It is further to be noted that electrical pressure actuated switch 25 could be replaced by a pressure actuated valve located in the acoustical feedback path, e.g., a flap valve located in tube 21 or microphone probe 23.

Figure 3:
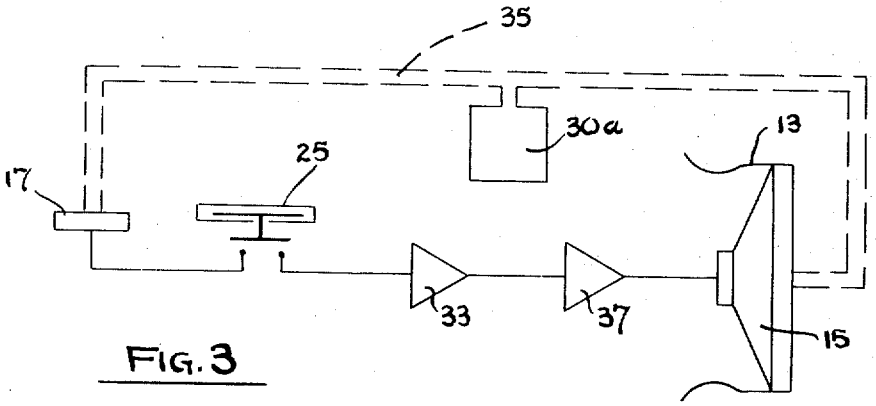
FIG. 3 is a schematic drawing of the electrical and acoustical circuitry of the embodiment of FIG. 1.

Referring now to FIG. 3, the first embodiment of the invention is schematically illustrated. The output of microphone 17 passes through pressure actuated switch 25 and thence is amplified by means of voltage amplifier 33 and power amplifier 37, the output of amplifier 37 being fed to loudspeaker 15. Equalization is used in the amplifiers to compensate for phase shifts introduced into the system by virtue of the loudspeaker and microphone characteristics. For optimum response the feedback components of the microphone output should be in phase with the signal that produced it. The acoustical output of speaker 15 is connected by means of acoustical channel 35 to the input of microphone 17. Connected to the acoustical channel 35 is a resonant cavity 30a formed by the oral cavity of the operator. The frequency of the acoustical feedback and thus the frequency of the amplifier and speaker outputs is determined by the resonant frequency of oral cavity 30a which is determined by the operator of the instrument.

*Summarizing then in the apparatus shown in FIGS. 1 through 3 the housing 13, loudspeaker 15 with cone and coil and tube member 21 form a means for introducing sound energy into the oral cavity of the player to obtain information on the size thereof. The sound energy in the oral cavity is monitored by means of tube member 23 and the microphone 17 in the tube member 23 which functions to convert acoustic energy to electric energy. Since*

*the oral cavity is arranged in the feedback loop between the output of the loudspeaker and the input of the microphone it controls the phase and amplitude of the sound reaching the microphone so that the size of the oral cavity of the player estalishes the fundamental frequency of the oscillations of an electric audio oscillator and in this way as the size of the oral cavity changes the conditions for oscillation of the electric audio oscillator changes and the sound emitted from the open end of the loudspeaker changes. Each loudspeaker converts variations of electric energy to corresponding variations of acoustic energy.*

Figure 4:
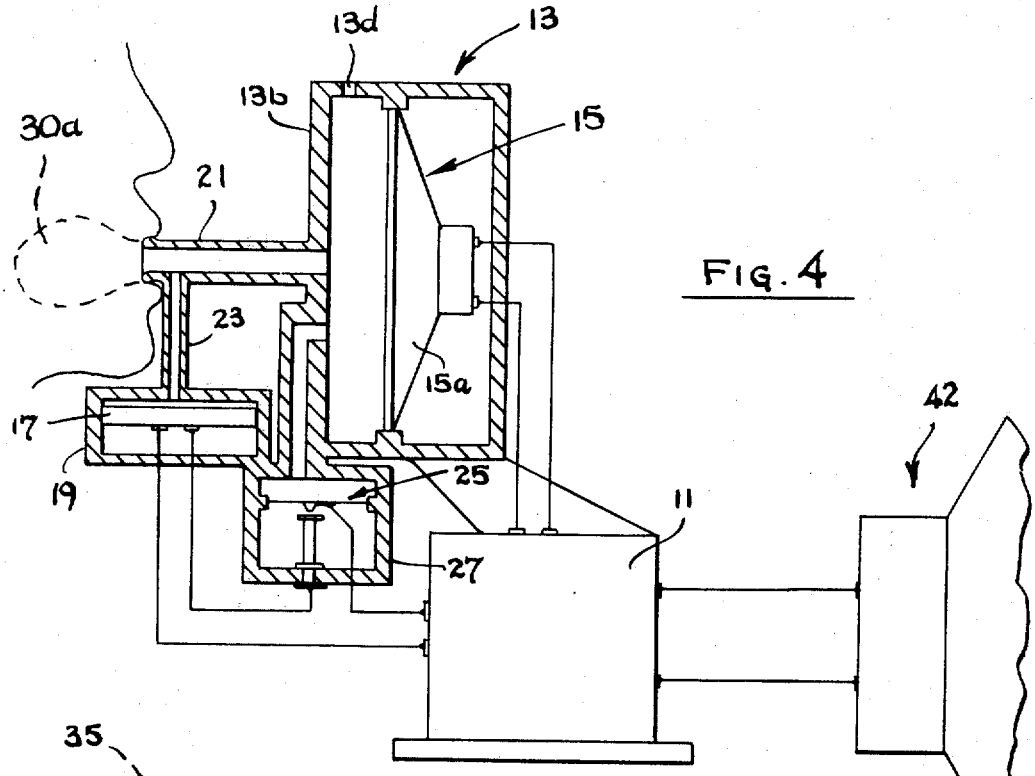
FIG. 4 is a view in partial cross-section of a second embodiment of the device of the invention.
Figure 5:
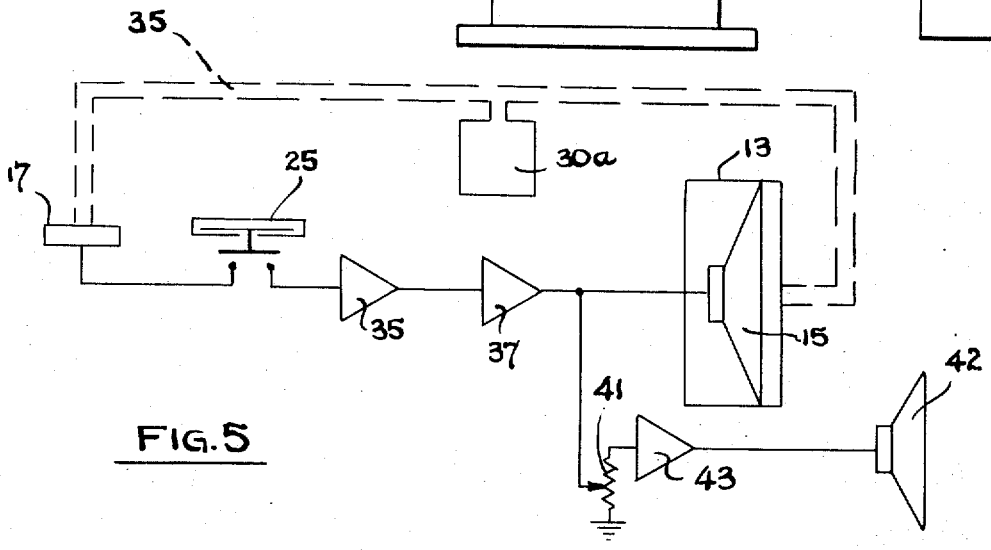
FIG. 5 is a schematic drawing illustrating the electrical and acoustical circuitry of the embodiment of FIG. 4.

Referring now to FIGS. 4 and 5, a second embodiment of the device of the invention is illustrated. This second embodiment is similar to the first, except that the output of the speaker in the acoustical feedback circuit is not used as the [ sound output, the ] *musical sound output, the musical sound, or* tone output rather being derived from a separate speaker which receives a signal from the power amplifier. As can be seen in FIG. 4, speaker 15, rather than having a horn to radiate the output of the back cone surfaces 15a, is fully enclosed in casing 13. Also, a separate speaker 42, which may be of a larger size than speaker 15, is utilized in conjunction with a separate amplifier to radiate the sound, as now to be explained in connection with FIG. 5. Otherwise, the second embodiment is the same as the first just described.

Referring now to FIG. 5, an acoustical feedback path 35 is provided as before between the output of speaker 15 and the input of microphone 17 with the oral cavity 30a being used to [ form the tones ] *control the pitch or fundamental frequency of the musical sounds produced.* The output of microphone 17 is fed through pressure actuated switch 25 to voltage amplifier 35 and thence to power amplifier 37 the output of which is fed to speaker 15. Speaker 15 is fully enclosed in casing 13 so that except for the acoustical feedback, there is a minimum amount of radiation from the speaker cone. The output of amplifier 37 is also fed through potentiometer 41 to the input of amplifier 43, the output of amplifier 43 being fed to speaker 42. Potentiometer 41 is used as a volume control to control the sound output of the speaker 42. Other controls may also be incorporated in amplifier 43, such as tone controls, modulation controls, etc. Further, modulation signals can be introduced into the amplifier from external sources to further modify the musical sounds generated. Thus, the second embodiment affords greater versatility of operation and enables the utilization of a separate higher fidelity sound system in radiating the sound output. Further, potentiometer 41, amplifier 43 and speaker 42 may be formed by an existing sound system to which the output of amplifier 37 is fed.

The musical instrument of this invention thus provides a unique [ device for generating tones ] *musical sound apparatus and method and unique musical instrument* [ with one's oral cavity without the use of the vocal cords or an external tone signal ] .

While the device of this invention has been described and illustrated in detail, it is to be clearly understood that this is intended by way of illustration and example only and is not to be taken by way of limitation, the spirit and scope of this invention being limited only by the terms of the following claims.

I claim:

1. A mouth operated electronic musical instrument for use in forming tones comprising:

a microphone, a loudspeaker, amplifier means for amplifying the output of said microphone, the output of said amplifier means being fed to said loudspeaker, means for providing an acoustical feedback path between the loudspeaker and the microphone input comprising a casing for enclosing said microphone, enclosure means for forming an enclosure with said loudspeaker, and tube means for interconnecting said casing and said enclosure means, and a mouthpiece connected to said means for providing a feedback path.

2. The instrument of claim 1 wherein said tube means comprises a first tube connected at one end thereof to the enclosure means, said mouthpiece being located at the other end of said first tube, and a second tube interconnecting said first tube and said casing.

3. The instrument of claim 1 wherein said enclosure means for forming an enclosure with said loudspeaker comprises a housing having an open end portion forming a horn for said loudspeaker, said loudspeaker having a speaker cone and being mounted in said housing, one side of said cone forming an enclosure with said housing, the other side of said cone radiating sound through said horn, said tube means being connected to the last mentioned enclosure.

4. The instrument of claim 1 wherein said enclosure means comprises a casing enclosing said loudspeaker and further including an amplifier connected to receive the output of said amplifier means and a second loudspeaker connected to receive the output of said amplifier.

5. A mouth operated electronic musical instrument for use in forming tones with an operator's oral cavity comprising:

a microphone, a casing for enclosing said microphone, a loudspeaker having a cone for radiating sound, a housing for said loudspeaker, the cone of said speaker and said housing forming an enclosure for the sound radiated by one side of said cone, amplifier means for amplifying the output of said microphone, the output of said amplifier means being fed to said loudspeaker, means providing an air channel interconnecting the microphone casing and said enclosure, and a mouthpiece for use by the operator, connected to said last mentioned means.

6. The instrument of claim 5 and further including a switch having a pressure responsive actuator and a pair of electrical switch contacts, a casing member for housing said switch and means for providing an air channel between said casing member and said mouthpiece, said switch contacts being interposed between said microphone and said loudspeaker, whereby said switch contacts are closed only when there is a predetermined air pressure signal at said mouthpiece.

7. The instrument of claim 5 wherein said housing is shaped to form a horn for radiating sound from the other side of the loudspeaker cone.

8. The instrument of claim 5 wherein said housing encloses the other side of said cone and further including an amplifier connected to receive the output of said amplifier means and a second loudspeaker driven by the output of said amplifier to provide the sound output.

9. A mouth operated electronic musical instrument for use in forming tones comprising:

a microphone, a loudspeaker, amplifier means for amplifying the output of said microphone, the output of said amplifier means being fed to said loudspeaker, means for providing an acoustical feedback path between the loudspeaker output and the microphone input, a mouthpiece connected to said means for providing a feedback path, pressure actuated switch means for controlling the generation of said tones, and channel means interconnecting said switch means and said mouthpiece, said switch means being actuated to cause tones to be generated only when a pressure signal is introduced into said mouthpiece.

10. The instrument of claim 9 wherein said pressure actuated switch means is an electrical switch interposed between said microphone and said loudspeaker.

*11. In oral cavity controlled musical sound apparatus, the combination comprising:*

*means for introducing sound energy into the oral cavity of a player to obtain information on the size thereof;*

*means for acoustically monitoring the sound energy information and producing an electric output control signal containing information about the size of the oral cavity; and*

*electric signal utilization means utilizing the information about oral cavity size in said electric output control signal to establish the pitch of musical sounds emitted into the atmosphere by a device that converts variations of electric energy to corresponding variations of acoustic energy.*

*12. In oral cavity size controlled musical sound apparatus as set forth in claim 11 wherein said means for introducing sound energy includes a housing for confining a mass of air in a first cavity having a constant configuration with a first tubular member in communication with said first cavity through a small opening and terminating in a mouthpiece, a loudspeaker cone for vibrating the confined mass of air in the first cavity to generate sound energy that is transmitted through the small opening and first tubular member into the player's oral cavity.*

*13. In oral cavity size controlled musical sound apparatus as set forth in claim 11 wherein said means for acoustically monitoring include a microphone in a tube in communication with the means for introducing sound energy.*

*14. In oral cavity size controlled musical sound apparatus as set forth in claim 11 including an electric amplifier having an input coupled to the output control signal and an output coupled back to said means for introducing sound energy to form an electric oscillator whereby the oral cavity forms an acoustic load in the feedback loop of the electric oscillator and a change in size of the oral cavity changes the frequency of the electric oscillator.*

*15. In an oral cavity size controlled electric musical instrument, the combination comprising:*

*a hollow body defining a first cavity having a substantially constant configuration for confining a mass of air and communicating with external surrounding air through a small opening in the body to form a cavity resonator, said body having a mouthpiece forming a passage into the first cavity through said small opening, said mouthpiece being adapted to receive the lips of the player so that with the oral cavity of the mouth of the player of the instrument there is formed a resonant frequency for the combined first cavity and player's oral cavity;*

*a loudspeaker in the first cavity having a cone and a coil for vibrating the confined mass of air to generate sound energy that is introduced into the oral cavity to obtain information on the size thereof and transmitted back and forth between the first cavity and the oral cavity through the small opening;*

*means for acoustically monitoring the sound energy including a microphone in a tube in communication with the mouthpiece to produce output control signal electric oscillations corresponding to the monitored sound energy; and*

*utilization means including a first electric amplifier having an input coupled to said output control signal and an output coupled back to said loudspeaker coil by a feedback line to form an electric oscillator having a feedback loop whereby the oral cavity forms an acoustic load in the feedback loop with the loudspeaker in the feedback loop of the electric oscillator and a change in the size of the oral cavity changes the frequency of the electric oscillator.*

*16. In oral cavity size controlled musical sound apparatus as set forth in claim 15 including a second electric amplifier coupled to the output of said first electric amplifier and a second loudspeaker coupled to the output of said second amplifier to emit musical sounds into the atmosphere from the second loudspeaker.*

*17. In a method of selectively controlling the pitch of musical sounds emitted into the atmosphere, the steps of:*

*introducing sound energy into the oral cavity of a player to obtain information on the size thereof;*

*acoustically monitoring said sound energy information and producing an electric output control signal containing information about the size of the oral cavity; and*

*utilizing the information on oral cavity size in said output control signal to establish the pitch of musical sounds emitted into the atmosphere.*

*18. In a method as set forth in claim 17 further including the steps of:*

*electrically amplifying the output control signal and feeding said amplified output control signal back to a source of the sound energy introduced into the oral cavity to form an electric oscillator having a feedback loop with the oral cavity forming an acoustic load in the feedback loop of the electric oscillator and a change in the size of the oral cavity changes the frequency of the electric oscillator.*

*19. In a method as set forth in claim 18 further including the step of:*

*further amplifying the output control signal and converting said output control signal to musical sound waves in the atmosphere.*

*20. In an oral cavity size controlled method of selectively controlling the pitch of musical sounds emitted into the atmosphere, the steps of:*

*confining a mass of air in a first cavity having a constant configuration communicating with external surrounding air through a small opening to form a cavity resonator;*

*placing the lips of a player over the opening and setting the size of the player's oral cavity to establish a selected resonant frequency for the combined first cavity and oral cavity;*

*vibrating the confined mass of air in the first cavity to generate sound energy that is transmitted into the oral cavity through the small opening, the sound energy generated being passed back and forth through the small opening between the first cavity and the oral cavity to obtain information on the size of the oral cavity;*

*acoustically monitoring said sound energy and producing an output control signal; and*

*electrically amplifying the output control signal and feeding said amplified control signal back to a source of said generated sound energy introduced into the oral cavity to form an electric oscillator having a feedback loop with the oral cavity forming an acoustic load in the feedback loop whereby a change in the size of the oral cavity changes the frequency of the electric oscillator and the pitch of the sound emitted into the atmosphere.*

* * * * *